US006798770B1

United States Patent
Hollatz et al.

(10) Patent No.: US 6,798,770 B1
(45) Date of Patent: Sep. 28, 2004

(54) METHOD FOR HANDLING TELEPHONE CALLS VIA AT LEAST ONE TELEPHONE NETWORK USING THE INTERNET

(75) Inventors: Frank Hollatz, Munich (DE); Christian Schmidt, Augsburg (DE); Joachim Ungruh, Munich (DE); Alfred Jugel, Geretsried (DE); Umesh Bhavsar, Graefelfing (DE); Andreas Lindenthal, Munich (DE); Thomas Lange, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/082,915

(22) Filed: May 21, 1998

(30) Foreign Application Priority Data

May 27, 1997 (DE) .......................... 197 22 152

(51) Int. Cl.[7] .............................................. H04L 12/66
(52) U.S. Cl. ..................... 370/353; 370/356; 370/401; 370/463; 379/88.17; 379/265.09
(58) Field of Search ............................ 370/352, 395.52, 370/338, 401, 463, 467, 522, 237, 353–356; 379/88.13, 88.17, 88.18, 265.09, 900, 908, 114.01, 115.01, 118; 709/204, 219, 225, 227, 232, 249, 250

(56) References Cited

U.S. PATENT DOCUMENTS 5,608,786 A    3/1997  Gordon
5,956,391 A  * 9/1999  Melen et al.
5,987,430 A  * 11/1999 Van Horne et al. ........... 705/34
5,999,525 A  * 12/1999 Krishnaswamy et al. ... 370/352
6,064,653 A  * 5/2000  Farris
6,069,890 A  * 5/2000  White et al.
6,081,518 A  * 6/2000  Bowman-Amuah ......... 370/352
6,088,436 A  * 7/2000  Mashinsky ............. 379/210.01
6,130,933 A  * 10/2000 Miloslavsky ............. 379/90.01

FOREIGN PATENT DOCUMENTS

EP            0 765 068       3/1997

* cited by examiner

Primary Examiner—Dang Ton
Assistant Examiner—Inder Palmehra
(74) Attorney, Agent, or Firm—Morrison & Foerster LLP

(57) ABSTRACT

Telephone calls are handled via the Internet between an interworking unit relating to the calling subscriber and an interworking unit relating to the called subscriber. At least the telecommunications network to which the calling subscriber belongs as well as the interworking units are operated by the same provider. Access by a calling subscriber to the interworking unit and the passing on of the dialed telephone number of the called subscriber to the interworking unit are made dependent on the identification of the call as an Internet telephone call and dependent on the result of an access authorization check. Charging for use of the telephone network and of the Internet for such a call does not commence until the connection is made, as in the case of a call which uses only the telephone network.

15 Claims, 2 Drawing Sheets

METHOD FOR HANDLING TELEPHONE CALLS VIA AT LEAST ONE TELEPHONE NETWORK USING THE INTERNET

BACKGROUND OF THE INVENTION

The present invention relates to a method for handling telephone calls via at least one telephone network using the Internet between an interworking unit relating to the calling subscriber and a network outlet point relating to the called subscriber.

Terminals which communicate with one another using such links may be either telephone terminals or else data terminals in the form of personal computers. The computers are then equipped with appropriate telephone software and with a microphone and loudspeaker.

In the case of this type of telephony, also known as "Voice Over Internet" (VOI), the operator of the telecommunications network and the service provider, who makes available the handover points from the telephone network to the Internet, have until now been different providers.

FIG. 1 will be used to explain how such VOI links have been handled until now. This involves the link from a calling subscriber, a so-called A subscriber with a terminal ATL which is connected to a first local exchange LE11, to a called subscriber, a so-called B subscriber having a terminal BTL which is connected to another local exchange LE21.

In the case of the illustrated example, the local exchanges are part of telecommunications networks PSTN1 and PSTN2, respectively, which may belong to different operators, for example telephone networks in different countries.

The subscriber terminals ATL and BTL may be telephone terminals. However, they could also be the data terminals mentioned above which, when operating in the telephone mode, are dealt with by the exchange like a telephone terminal.

A second local exchange LE1 and LE2 is shown in both of the telephone networks, via which the subscriber terminals ATL and BTL can access the Internet INT. These exchanges are accordingly connected to interworking units POP1 and POP2 via which access to and exit from the Internet take place.

The operators of the telephone networks PSTN1 and PSTN2 are not the same providers as that provider who makes available the interworking units POP1 and POP2 that are illustrated.

When setting up a VOI link between the calling A subscriber and the called B subscriber, the following processes take place. The A subscriber produces a telephone link from his terminal ATL, by appropriate dialing, to the interworking unit POP1 relating to him and, in this case, this telephone link passes via the local exchanges LE11 and LE1.

An interactive dialogue now follows between the subscriber and the interworking unit, in the course of which the subscriber is requested to enter an authentication code, possibly for the purpose of billing to this credit card number, and the telephone number of the desired B subscriber. Once authentication has been completed, an Internet link is then set up, via an Internet Server VOI-S, to the interworking unit relating to the B subscriber, that is to POP2. A further telephone link is set up from this network outlet point POP2 to the terminal BTL in the telephone network PSTN2 via the exchanges LE2 and LE21. In conjunction with voice transmission via the Internet, the interworking units POP1 and POP2 also have to convert the voice information (provided for transmission in the connected channels) into the data packets for Internet transmission, as well as corresponding reverse conversion.

Particularly owing to the dialogue between the A subscriber and the interworking unit, and owing to the transmission of the dialed numbers required in this case, it may take several minutes to set up such a link. Since, only access to the Internet is subject to charges, such a VOI link may be attractive from a cost point of view particularly when, as in the present case, the telephone networks to which the subscribers to be connected are networks in different countries. In the case of the present link, the A subscriber, is subject to a telephone charge from the operator of the telephone network PSTN1 for the link from the subscriber terminal ATL to the interworking unit POP1. It is also subject to a pro rata charge, in a separate billing process, by the provider of the interworking units POP1 and POP2, which charge provides payment for the use of the interworking units and covers the costs of the telephone link from the interworking unit POP2 to the terminal BTL. These costs have to be born by the POP operator. Even if no link is made, as a result of the B subscriber being engaged or not answering, the A subscriber incurs telephone charges for the abovementioned link from his terminal to the POP1.

SUMMARY OF THE INVENTION

The object of the present invention is to make the handling of telephone calls using the Internet more convenient for the calling telephone subscriber.

In general terms the present invention is a method for handling telephone calls using the Internet between an interworking unit relating to the calling subscriber. At least the telecommunications network to which the calling subscriber belongs as well as the interworking units are operated by the same provider. Access by a calling subscriber to the interworking unit and the passing on of the dialed telephone number of the called subscriber to the interworking unit are made dependent on the identification of the call as an Internet telephone call and on the result of an access authorization check. Charging for use of the telephone network and of the Internet together for such a call does not commence until the connection is made, as in the case of a call which uses only the telephone network.

At least the telephone network to which the calling subscriber is connected as well as the interworking units which are used in conjunction with such a VOI link are operated by the same provider. The telephone exchange from which access to the Internet is made via an interworking unit, and this interworking unit, in this case cooperate such that an additional code word to be dialed by the calling subscriber when he wishes to make a VOI call is evaluated in the telephone exchange, the access authorization of the calling subscriber to the VOI service is checked, and the telephone number of the B subscriber dialed by the A subscriber is passed on to the interworking unit only if authorization is confirmed. From there, the other call setting up procedures are then initiated in the previous manner. Furthermore, common charging is effected for the telephone link as far as the interworking unit and for the part of the link which continues from that point, charges not being incurred (as in the case of normal telephone calls) until the call is actually made, that is to say the B subscriber answers.

Thus, the calling subscriber avoids the tedious, time-consuming procedures involved with communication with the interworking unit, and only one telecommunications bill is required for VOI calls.

Advantageous developments of the present invention are as follows.

The access check to the interworking unit relating to the calling subscriber for setting up a telephone link is carried out in the telephone exchange to whose exchange area the interworking unit belongs. The interworking unit is handled as a member of a closed user group, to which access by the calling subscriber is possible only by dialing an access code. This access code is converted, after an authorization check, into the destination number of the interworking unit. Thus, communication between the telephone exchange and the interworking unit can be handled expediently. Accordingly, in the exchange to whose exchange area the interworking unit belongs, this is regarded as a member of a closed user group to which access is possible only by the calling subscriber dialing an access code, this access code being converted, after an authorization check, into the destination number of the network access point.

The interworking unit is connected to the associated telephone exchange in the form of an ISDN primary connection. The telephone number of the calling subscriber is transmitted from the telephone exchange to the network access point while the call is being set up in the ISDN D channel.

The VOI telephone calls may be charged for as a function of the destination, as a function of time or in a mixed form.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
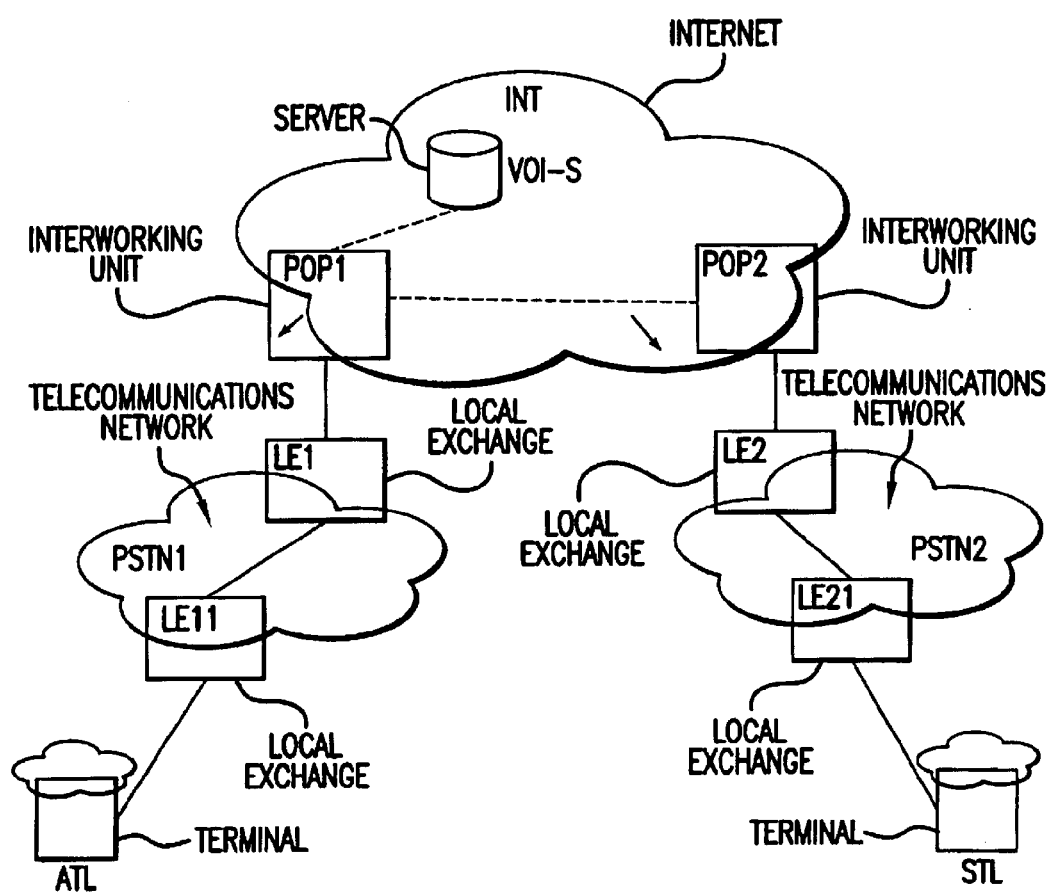
FIG. 1 shows the prior art network scenario for VOI calls.
Figure 2:
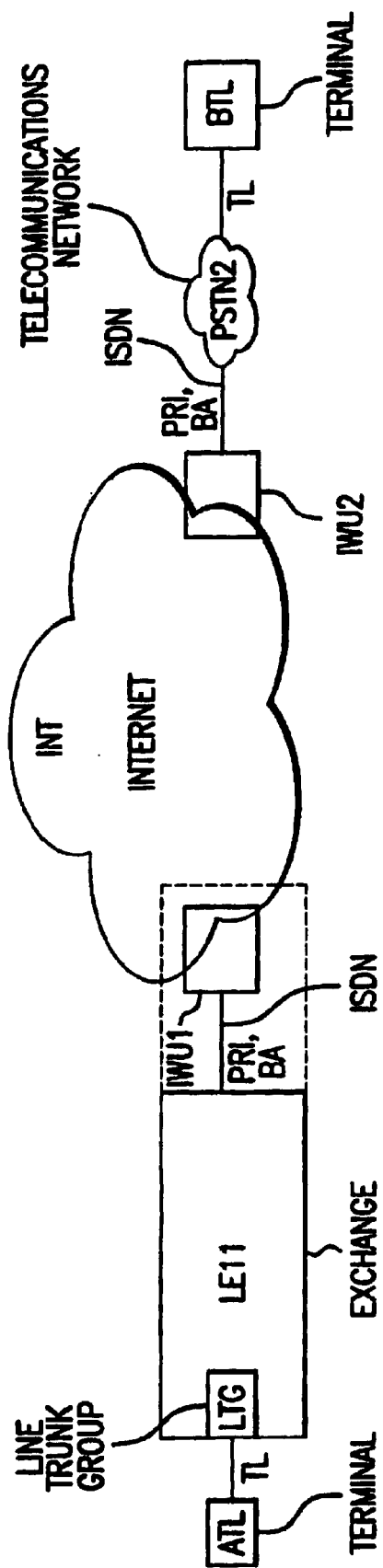
FIG. 2 shows a network concept for VOI calls, with a specification with respect to the method of the present invention.

In the illustration according to FIG. 2, it is assumed that the exchange LE11 to which the telephone terminal ATL of the calling subscriber is connected and which belongs to the telecommunications network is connected directly to an interworking unit. These interworking units are denoted by IWU1 and IWU2 here. When carrying out the method according to the invention in conjunction with a VOI call, these handover and exit points essentially now only have to carry out the conversion of the voice information (transmitted on a channel-linked basis in the telephone network) into data packets for transmission in the Internet INT, and the inverse process. As in the case of the embodiment described above, the interworking units are connected as ISDN connections, for example ISDN primary connection (PRI), to the relevant exchange LE11 or to an exchange (which is not illustrated here) of the telecommunications network PSTN2 to which the B subscriber of the call under consideration belongs.

The interworking units IWU1 and IWU2 may be integrated in the exchanges to which they are directly connected.

Thus, if the A subscriber now wishes to set up a VOI link to the B subscriber, he dials an access code for the VOI service as well as the telephone number of the B subscriber, for example in the form *34*0015011234. In the line trunk group LTG in which the subscriber connecting line TL connected to the terminal ATL ends, the call is identified on the basis of the access code *34* as a VOI call and, taking account of the equipment location of the A subscriber, his access authorization is confirmed. The call is then dynamically marked as a CUG (Closed User Group) call. The charge zone table applicable to a call to the B subscriber is then actuated, and the correct charge zone determined, in the co-ordination processor (which is not illustrated here) of the exchange LE11 in a lower-level tree structure set up for VOI calls.

In the line trunk group LTG, the access code *34* is replaced by the number of the interworking unit IWU1, and the telephone number of the B subscriber is transmitted to the interworking unit IWU while the call is being set up in the D channel of the ISDN connection. This is followed by the procedures for producing an Internet link to the interworking unit relating to the B subscriber, and a telephone link from there to the B subscriber. As soon as the B subscriber answers, that is to say the call is made, charge metering then starts in the exchange LE11.

It is also possible to provide for the charges to be indicated to the A subscriber during the call.

A VOI call of the type described may be made from an analogue telephone set, from the telephone set of an ISDN connection, from a personal computer with telephone software and appropriate hardware equipment, as well as from a coin-box telephone.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for handling telephone calls using an Internet between a first interworking unit that provides access between a telecommunications network of a calling subscriber and the Internet and a second interworking unit relating to a called subscriber, comprising:

operating at least a first telecommunications network to which the calling subscriber and the first and second interworking units belong, the first telecommunications network and first and second interworking units having a common provider which provides operation of the telecommunications network and makes available the first and second interworking units, such that at least a call connects to the first interworking unit without connecting outside the telecommunications network;

accessing by the calling subscriber the first interworking unit for a call and passing on a dialed telephone number of the called subscriber to the first interworking unit as a function of the call being identified as an Internet telephone call and as a result of an access authorization check; and commencing charging for use of the first telecommunications network and of the Internet together after a connection is made, wherein the call from the calling subscriber and a related connection between the first interworking unit and the internet is evaluated for charging purposes by the same network, wherein an access check to the first interworking unit relating the calling subscriber for setting up a telephone link is carried out in a first telephone exchange to whose exchange area the first interworking unit belongs, the first interworking unit being handled as a member of a closed user group to which access by the calling subscriber is possible only by dialing an access code, this access code being converted, after an authorization check, into a destination number of the first interworking unit.

2. The method according to claim 1, wherein the first interworking unit is connected to an associated telephone exchange by an ISDN connection, and wherein transmission of the telephone number of the called subscriber to the first interworking unit takes place while the call is being set up in an ISDN D channel.

3. The method according to claim 1, wherein telephone calls are charged for as a function of at least one of a destination and time.

4. The method according to claim 1, wherein the call connecting through the telecommunications network over the first interworking unit.

5. A method for handling telephone calls using an Internet between a first interworking unit that provides access between a telecommunications network of a calling subscriber and the Internet and a second interworking unit that provides access between a telecommunications network of a called subscriber and the Internet, comprising:

operating at least a first telecommunications network to which the calling subscriber and the first and second interworking units belong, the first telecommunications network and first and second interworking units having a common provider which provides operation of the telecommunications network and makes available the first and second interworking units, such that at least a call connects to the first interworking unit without connecting outside the telecommunications network;

accessing by the calling subscriber the first interworking unit for a call and passing on a dialed telephone number of the called subscriber to the first interworking unit as a function of the call being identified as an Internet telephone call and as a result of an access authorization check, the access check to the interworking unit being carried out in a first telephone exchange having an exchange area belonging to the first interworking unit, the first interworking unit being handled as a member of a closed user group, to which access by the calling subscriber is possible by dialing an access code, the access code being converted, after an authorization check, into a destination number of the first interworking unit; and commencing charging for use of the network and of the Internet together after a connection is made, wherein the call from the calling subscriber and a related connection between the first interworking unit and the internet is evaluated for charging purposes by the same network.

6. The method according to claim 5, wherein the first interworking unit is connected to an associated telephone exchange by an ISDN connection, and wherein transmission of the telephone exchange by an ISDN connection, and wherein transmission of the telephone number of the called subscriber to the first interworking unit takes place while the call is being set up in an ISDN D channel.

7. The method according to claim 5, wherein telephone calls are charged for as a function of at least one of a destination and time.

8. A method for handling telephone calls using an Internet between a first interworking unit that provides access between a telecommunications network of a calling subscriber and the Internet and a second interworking that provides access between a telecommunications network of a called subscriber and the Internet, comprising:

operating at least a first telecommunications network to which the calling subscriber and the first and second interworking units belong, the first telecommunications network and first and second interworking units having a common provider which provides operation of the telecommunications network an makes available the first and second interworking units, such that at least a call connects to the first interworking unit without connecting outside the telecommunications network;

accessing by the calling subscriber the first interworking unit for a call, the first interworking unit being connected to an associated telephone exchange by ISDN connection;

transmitting the telephone number of the called subscriber to the first interworking unit, while the call is being set up in an ISDN D channel, as a function of the call being identified as an Internet telephone call and a result of an access authorization check; and commencing charging for use of the telecommunications network and of the Internet together after a connection is made, wherein the call from the calling subscriber and a related connection between the first interworking unit and the internet is evaluated for charging purposed by the same network, wherein the access check to the interworking unit relating the calling subscriber for setting up a telephone link is carried out in the first telephone exchange to whose exchange area the first interworking unit belongs, the first interworking unit being handled as a member of a closed user group, to which access by the calling subscriber is possible only by dialing an acess code, this access code being converted, after an authorization check, into a destination number of the first interworking unit.

9. The method according to claim 8, wherein telephone calls are charged for as a function of at least one of a destination and time.

10. An apparatus for handling telephone calls using an Internet comprising:

a first interworking unit that provides access between a telecommunications network of a calling subscriber and the Internet and a second interworking unit that provides access between a telecommunications network of a called subscriber and the Internet, comprising:

a common provider that provides operation of a first telecommunications network to which the calling subscriber and the first and second interworking units belong and makes available the first and second interworking units, such that at least the call connects to the first interworking unit without connecting outside the telecommunications network;

wherein the calling subscriber's call is forwarded through the first interworking unit and transmitted to the called subscriber through the Internet as an Internet telephone call; and wherein the call from the calling subscriber and a related connection between the first interworking unit and the Internet is evaluated for charging purposes by the same network, and the common provider evaluates charging of the first telecommunications network and of the Internet together only after a connection is completed to the called subscriber.

11. The apparatus according to claim 10, wherein the first interworking unit is a member of a closed user group to which the calling subscriber belongs.

12. The apparatus according to claim 10, wherein the first interworking unit is connected to an associated telephone exchange by an ISDN connection.

13. The apparatus according to claim 10, wherein the common provider evaluates the charging such that there is no separate billing process for the connection to the first interworking unit.

14. The apparatus according to claim 13, wherein, even if no connection is made to the called subscriber, the calling subscriber does not receive a charge for the connection to the first interworking unit.

15. The apparatus of claim 10, wherein charging is evaluated by a telephone exchange coupled to the first interworking unit.

* * * * *